United States Patent [19]
Crump et al.

[11] Patent Number: 5,948,092
[45] Date of Patent: Sep. 7, 1999

[54] LOCAL BUS IDE ARCHITECTURE FOR A SPLIT COMPUTER SYSTEM

[75] Inventors: Dwayne T. Crump, deceased, late of Lexington, Ky., by Angela Crump, administratrix; John M. Landry, Wake Forest, N.C.; Chris Alan Nevitt, Raleigh, N.C.; William J. Sommerville, Raleigh, N.C.

[73] Assignee: International Business Machines Corporation, Armonk, N.Y.

[21] Appl. No.: 08/946,407

[22] Filed: Oct. 7, 1997

[51] Int. Cl.[6] .............................. G06F 13/00; G06F 13/38
[52] U.S. Cl. .......................... 710/129; 710/101; 360/135
[58] Field of Search ..................... 395/309, 728, 395/824, 871, 281; 711/4, 112; 360/135; 710/129, 240, 22, 51, 101

[56] References Cited

U.S. PATENT DOCUMENTS

| | | | |
|---|---|---|---|
| 5,065,262 | 11/1991 | Blackborow | 360/75 |
| 5,233,594 | 8/1993 | Wilhelm | 369/75.1 |
| 5,253,129 | 10/1993 | Blackborow et al. | 360/69 |
| 5,295,247 | 3/1994 | Change et al. | 395/325 |
| 5,297,067 | 3/1994 | Blackborow et al. | 364/708.1 |
| 5,428,796 | 6/1995 | Iskiyan et al. | 395/728 |
| 5,434,722 | 7/1995 | Bizjak et al. | 360/69 |
| 5,544,334 | 8/1996 | Noll | 395/309 |
| 5,581,715 | 12/1996 | Verinsky et al. | 395/309 |
| 5,581,716 | 12/1996 | Park | 395/309 |
| 5,590,336 | 12/1996 | Parry | 395/727 |
| 5,678,023 | 10/1997 | Adams et al. | 711/112 |

*Primary Examiner*—Gopal C. Ray
*Attorney, Agent, or Firm*—Anthony N. Magistrale

[57] ABSTRACT

Described is a personal computer system that includes a first housing coupled to a second housing with a multi-conductor cable. The first housing includes an IDE direct access storage device having an opening for receiving a removable storage medium. The second housing is separate from the first housing and includes a microprocessor coupled to a local bus and an expansion bus, a first IDE controller, a non-volatile storage device coupled to the local bus and a power supply. The cable is coupled to the first and second housings for electrically connecting devices in the first housing to devices in the second housing. The second housing has a first interface coupled to the expansion bus, the first IDE controller and the cable. The first housing includes a second interface coupled to the cable and the IDE device. The first interface is operative to (1) determine when a bus cycle initiated by a device in the second housing is directed to the IDE device in the first housing and (2) transfer data from the IDE controller to the IDE device via the cable and the second interface when a bus cycle is directed to the IDE device.

41 Claims, 11 Drawing Sheets

FIG. 9

| n |  |  | n |  |  |
|---|---|---|---|---|---|
| 1 | ON_OFF | THIS SIGNAL PARALLELS THE SWITCH BERG (751 PIN 9) | 2 | VOL_UP | DIGITAL VOLUME UP CONTROL FOR PLANAR AUDIO |
| 3 | P_LED | GREEN LED CONTROL (751 PIN 26) | 4 | VOL_DN | DIGITAL VOLUME DOWN CONTROL FOR PLANAR AUDIO |
| 5 | AUX5 | AUXILIARY POWER (FROM POWER SUPPLY CONNECTOR) | 6 | GND |  |
| 7 | IRQ1 | KEYBOARD INTERRUPT ALL OTHER IRQs NECESSARY ARE AVAILABLE ON THE ISA BUS | 8 | GND |  |
| 9 | IDE_LED | HDD INDICATOR DRIVE (FROM LED HEADER) | 10 | SMI_GEN | ALLOWS FOR SMI GENERATION ON FDD IO TRAP FOR MUXING FDD CONTROLLERS AND ON WRITES TO DATA OR CONTROL PORT OF KEYBOARD CONTROLLER 224 |

| PIN | SIGNAL | PIN | SIGNAL |
|---|---|---|---|
| 1 | DATA15 | 26 | CD_AUDIO_L |
| 2 | DATA14 | 27 | CD_AUDIO_LGND |
| 3 | DATA13 | 28 | CD_AUDIO_R |
| 4 | DATA12 | 29 | CD_AUDIO_RGND |
| 5 | DATA11 | 30 | +12V_DROP |
| 6 | DATA10 | 31 | +12V_DROP |
| 7 | DATA9 | 32 | +12V_DROP |
| 8 | DATA8 | 33 | *12VDC |
| 9 | ADR_EN | 34 | *12VDC |
| 10 | DAT_EN# | 35 | *12VDC |
| 11 | R/W # | 36 | GND |
| 12 | IRQ_STRB# | 37 | GND |
| 13 | TC_BUF | 38 | GND |
| 14 | PDIAG # | 39 | GND |
| 15 | DASP # | 40 | GND |
| 16 | FDD-DRQ # | 41 | GND |
| 17 | CSEL | 42 | GND |
| 18 | DATA7 | 43 | GND |
| 19 | DATA6 | 44 | GND |
| 20 | DATA5 | 45 | GND |
| 21 | DATA4 | 46 | IDE_DACK # |
| 22 | DATA3 | 47 | IDE_DRQ # |
| 23 | DATA2 | 48 | PWR_LED_ANODE |
| 24 | DATA1 | 49 | AUX5 |
| 25 | DATA0 | 50 | ON_PULSE |

FIG. 11

LOCAL BUS IDE ARCHITECTURE FOR A SPLIT COMPUTER SYSTEM

RELATED APPLICATIONS

The present invention is believed to be related to the following pending applications:

Application Ser. No. 08/721,651, filed Sep. 23, 1996, and entitled "SPLIT SYSTEM PERSONAL COMPUTER" (further identified as Attorney Docket No. RP9-95-045);

Application Ser. No. 08/721,653, filed Sep. 23, 1996, and entitled "MEDIA CONSOLE FOR A SPLIT SYSTEM PERSONAL COMPUTER" (further identified as Attorney Docket No. RP9-95-046);

Application Ser. No. 08/721,650, filed Sep. 23, 1996, and entitled "MULTI-CONDUCTOR CABLE ARCHITECTURE AND INTERFACE FOR A SPLIT SYSTEM PERSONAL COMPUTER" (further identified as Attorney Docket No. RP9-96-009);

Application Ser. No. 08/717,558, filed Sep. 23, 1996, and entitled "METHOD FOR INTERFACING A MEDIA CONSOLE AND A SYSTEM UNIT" (further identified as Attorney Docket No. RP9-96-014); and Application Ser. No. 08/954,996 filed Oct. 8, 1997, and entitled "SYSTEM AND METHOD FOR CONTROLLING DEVICE WHICH IS PRESENT IN MEDIA CONSOLE AND SYSTEM UNIT OF A SPLIT COMPUTER SYSTEM" (further identified as Attorney Docket No. RP9-97-001).

BACKGROUND OF THE INVENTION

1. Field of the Invention

The present invention relates to personal computer systems and more particularly to a split system personal computer which includes a media console containing user interactive components (e.g., CD-ROM drive, power switch) coupled to a processing unit having system components (e.g., central processing unit, memory, hard disk drive) via a cable and wherein an integrated drive electronics (IDE) direct access storage device in the media console is operated through a connection to an IDE controller on a planar board in the processing unit.

2. Description of Related Art

Personal computer systems are well known in the art. Personal computer systems in general, and IBM Personal Computers in particular, have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including all RAM and BIOS ROM, a system monitor, a keyboard, one or more flexible diskette drives, a fixed disk storage drive (also known as a "hard drive"), a so-called "mouse" pointing device, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's Personal Computer AT and IBM's Aptiva.

Historically, a personal computer (PC) was a relatively large box that sat on top of a desk and contained all of the electronics—the processor, memory, IO devices, floppy disk drive, etc. This was known as the system unit and required a significant amount of desktop work space. The monitor was traditionally a cathode ray tube (CRT) that was placed on top of the system unit. The keyboard and (eventually a mouse) was placed in front of the system unit to provide for user input. Accordingly, these "desktop" computer systems combined all PC functions and accessibility in one enclosure on the desktop where significant space is required and noise sources are relatively close to the user. In addition, there was no way to compact the elements when the PC was not in use.

In order to reduce the clutter that a personal computer caused on the desktop, a tower design soon emerged that moved the system unit components into a tower form-factor that sat along-side the desk. The CRT now sat directly on the desk with the keyboard and mouse in front of it. However, this "minitower" type unit is typically placed on the floor where accessibility to drives (floppy and CD-ROM), power, and system activity (LEDs) is compromised and awkward. These two form factors (the "desktop" and "minitower" systems) have endured for quite some time with just various changes in the size, shape and color.

Recently, an additional form factor has been developed. The above related applications describe a split system personal computer form factor that significantly reduces the amount of desktop space needed, reduces noise on the desktop and provides easy accessibility to removable media drives. For example, the above-referenced application Ser. No. 08/721,650, describes a computer system that includes a media console coupled to a system unit with a multi-conductor cable. The media console contains at least one direct access storage device (e.g., floppy disk drive or CD-ROM drive). The system unit is separate from the media console and includes a microprocessor, a non-volatile storage device and a system power supply. The multi-conductor cable has one end coupled to the media console and another end coupled to the system unit for electrically connecting devices in the media console to devices in the system unit. The system unit has a first interface coupled to the expansion bus and the cable, and the console has a second interface coupled to the cable and the direct access storage device in the console.

The media console components connect to the system unit through the first interface and multi-conductor cable. The first interface can be an industry standard architecture (ISA) host card. This design makes the components appear as though they are directly connected to the ISA bus, so their remote location is transparent to operating system software. Because all the components are connected through the ISA bus, the performance of the integrated drive electronics (IDE) CD-ROM drive in the media console is limited by the ISA architecture and bandwidth. The cycle time for each 16 bit transfer from the IDE CD-ROM drive is about 875 ns, which yields a maximum transfer rate of about 2.3 MB/s. Not only are these CD-ROM data transfers relatively slow, but each data word must be transferred by a CPU instruction.

It is therefore desirable to provide a split computer system which can increase the performance of the CD-ROM in the media console.

SUMMARY OF THE INVENTION

The present invention is directed to a personal computer system that includes a first housing coupled to a second housing with a multi-conductor cable. The first housing includes an IDE direct access storage device having an opening for receiving a removable storage medium. The second housing is separate from the first housing and includes a microprocessor coupled to a local bus and an expansion bus, a first IDE controller, a non-volatile storage device coupled to the local bus and a power supply for supplying power to the system. The cable has one end coupled to the first housing and another end coupled to the second housing for electrically connecting devices in the first housing to devices in the second housing. The second housing has a first interface coupled to the expansion bus, the first IDE controller and the cable. The first housing includes a second interface coupled to the cable and the IDE direct access storage device. The first interface is operative to (1) determine when a bus cycle initiated by a device in the second housing is directed to the IDE direct access storage device in the first housing and (2) transfer data from the first IDE controller to the IDE direct access storage device via the cable and the second interface when a bus cycle is directed to the IDE direct access storage device.

The IDE direct access storage device can be a CD-ROM drive and the first housing can further include a floppy disk drive (FDD) coupled to the second interface. The first interface is operative to (1) determine when a bus cycle initiated by a device in the second housing is directed to the floppy disk drive or the CD-ROM drive and (2) transfer data from (I) the expansion bus to the floppy disk drive via the cable and the second interface when the bus cycle is an expansion bus cycle or (ii) the first IDE controller to the CD-ROM drive via the cable and the second interface when the bus cycle is an IDE bus cycle.

The first interface can include a first electronic card connected to the expansion bus and the cable. The first electronic card includes an IDE port coupled to the first IDE controller via an IDE bus, a control circuit for monitoring the expansion bus, and a multiplexer for multiplexing over the cable IDE bus and expansion bus address signals, IDE bus and expansion bus data signals and interrupt request signals between the expansion bus and the second interface. The second interface can be a second electronic card having a de-multiplexer with an input coupled to the cable and an output coupled to the IDE direct access storage device.

By providing a system for operating the IDE DASD in first housing through a connection to the first IDE controller on the planar in the second housing, the present invention provides increased performance through decreased cycle times. In addition, the present invention allows the first IDE controller to transfer data through DMA data transfers which allows the microprocessor to perform other tasks at the same time the first IDE controller performs data transfers.

BRIEF DESCRIPTION OF THE DRAWINGS

FIG. 9 is a table of each signal of the 10 pin planar connector on the ISA/IDE interface card along with its function description.

FIG. 11 is a table a signal layout of the multi-conductor flexible cable used in accordance with the present invention.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
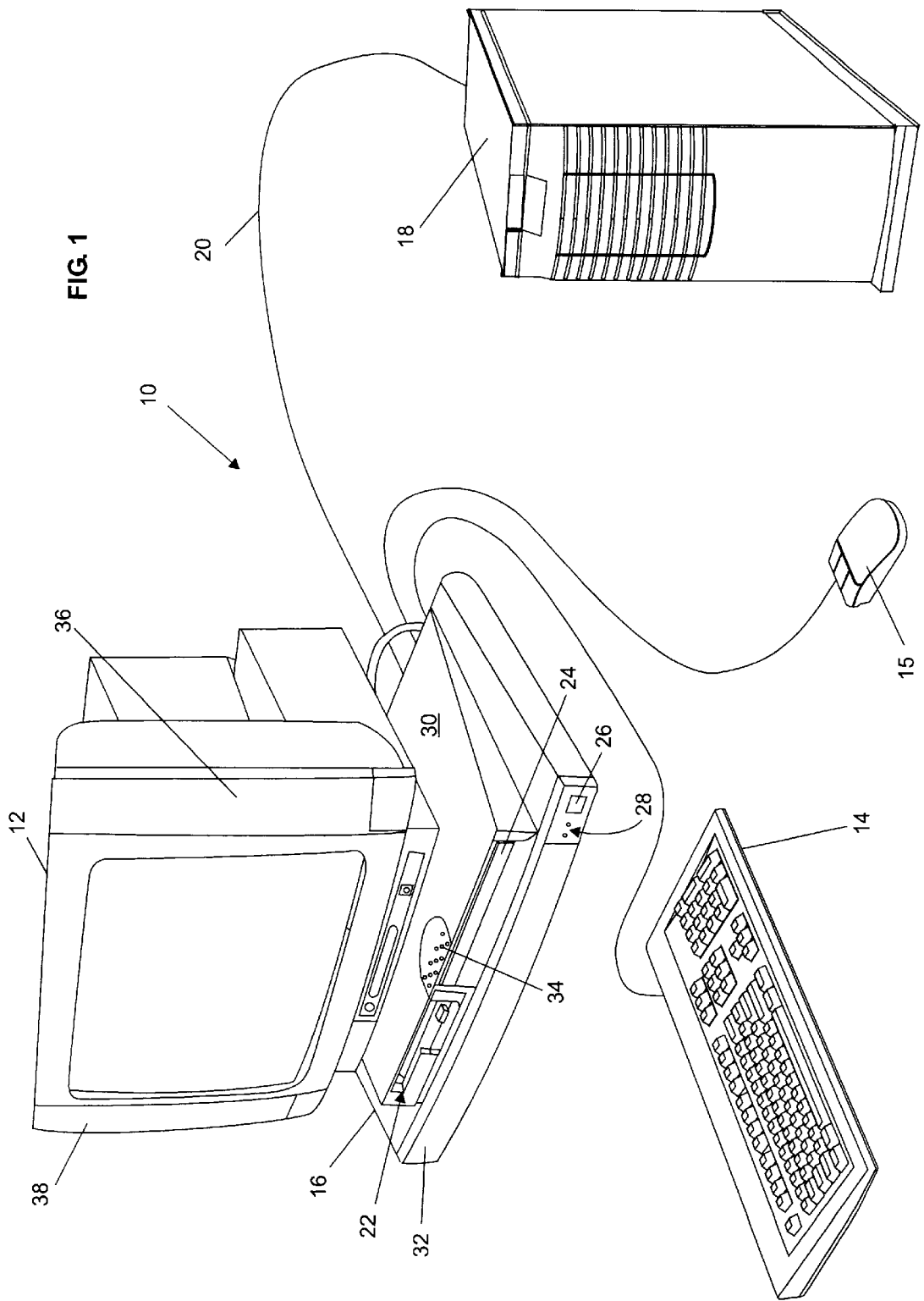
FIG. 1 is a perspective view of a computer system embodying the present invention wherein a drive housing is in an open position.

Referring to the accompanying drawings, a split system personal computer embodying the present invention is there shown and generally indicated at 10 (FIG. 1). The computer system 10 may have an associated monitor 12, keyboard 14, mouse 15 and printer (not shown). The computer 10 includes a media console 16 which is connected to a system or processing unit 18 by a multi-conductor flexible cable 20. The media console 16 can be placed on top of a desk near the monitor 12 and includes all of the user interactive components of the computer system 10 including a floppy disk drive 22, CD-ROM drive 24, power on/off switch 26, status indicators 28 (e.g., power and hard drive activity) and input device ports (e.g., keyboard and mouse). The system unit 18 on the other hand contains all the power, bulky and noisy components that a user does not need to interact with and can be placed under or behind the desk. For example, as will be described in more detail below, the system unit 18 includes a central processing unit (CPU), planar, memory, hard disk drive, expansion bus slots (PCI, ISA), expansion drive bays, power supply, fan(s) and video/graphics subsystem.

Figure 2:
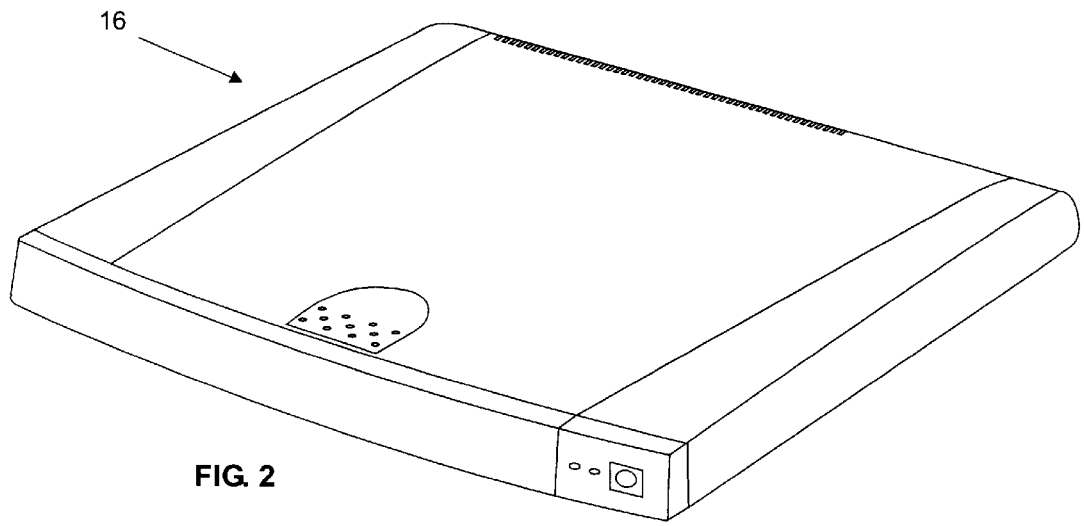
FIG. 2 is a perspective view of the media console of FIG. 1, wherein the drive housing is in a closed position.

The internal mechanical elements allow the drive bay housing 30, which contains the floppy disk drive 22 and CD-ROM drive 24, to move between an open position shown in FIG. 1 and a closed position shown in FIG. 2. In the open position, a user can access the openings in floppy disk drive 22 and/or CD-ROM drive 24 to insert/remove a floppy or compact disk respectively as needed. On the other hand, in the closed position, the openings in FDD 22 and CD-ROM drive 24 are concealed with a front panel of the base member 32 and cannot be accessed. In addition, an optional lock (not shown) can be provided on the media console 16 to lock the drive housing 30 in the closed position providing added security to prevent unauthorized access to the drives 22 and 24.

The internal mechanical assembly allows the drive housing 30 to raise from the console base 32 in one smooth, fluid motion when unlatched and remain supported in the open position (FIG. 1). The drive housing 30 can be raised and unlatched from the closed position (FIG. 2) to the open position (FIG. 1) by a user simply pressing down on the push pad 34, and lowered and latched from the open position to the closed position by a user again pushing down on the push pad 34. This conserves and minimizes space on the desktop, protects the floppy disk drive 22 and CD-ROM drive 24 when in the closed position and also provides easy accessibility of the drives 22 and 24 to the user when needed.

The personal computer system 10 is a split system in that it separates the media components (e.g., floppy disk drive 22 and CD-ROM drive 24) within media console 16 from the central processing unit (CPU), hard drive and power supply which are located within the separate system unit 18. In other words, the computer system 10 removes all the components which a user does not need to interact with away from the desktop work space. As a result, the components which are disposed in the media console 16 on the desktop have a much smaller profile than conventional desktop personal computers. For example, the dimensions of media console 16 when the drive housing 30 is in the closed position can be 55 mm high, 260 mm deep and 390 mm wide as compared to a conventional desktop unit of dimensions 125 mm high, 435 mm deep and 380 mm deep. Yet, unlike the tower design, all user interaction is made easily accessible on the desktop without the need to reach down to a tower unit. In addition, when the computer 10 is not in use, the keyboard 14 may be stored on top of the media console 16 under the monitor 12 to provide an even more compact system. Moreover, the media console 16 is also very low power compared to the processing unit 18 such that it does not produce excessive heat or require a fan.

The monitor 12 can have multimedia speakers 36 and 38 built into opposite sides of the front thereof or the system 10 can have separately detached speakers (not shown) for providing sound. The monitor 12 can be suspended above the media console 16 with a cantilevered monitor stand 40. The monitor stand 40 is self supportive so the monitor weight is not placed on top of the media console 16 and allows the drive housing 30 to raise unimpeded. The stand 40 fits underneath the opposite ends of the media console 16 to keep the monitor 12 within the same "footprint" space as the media console 16. The stand 40 can be formed from standard tubular steel with a steel plate welded to the top for use in interfacing with the monitor's tilt swivel device (not shown).

Figure 3:
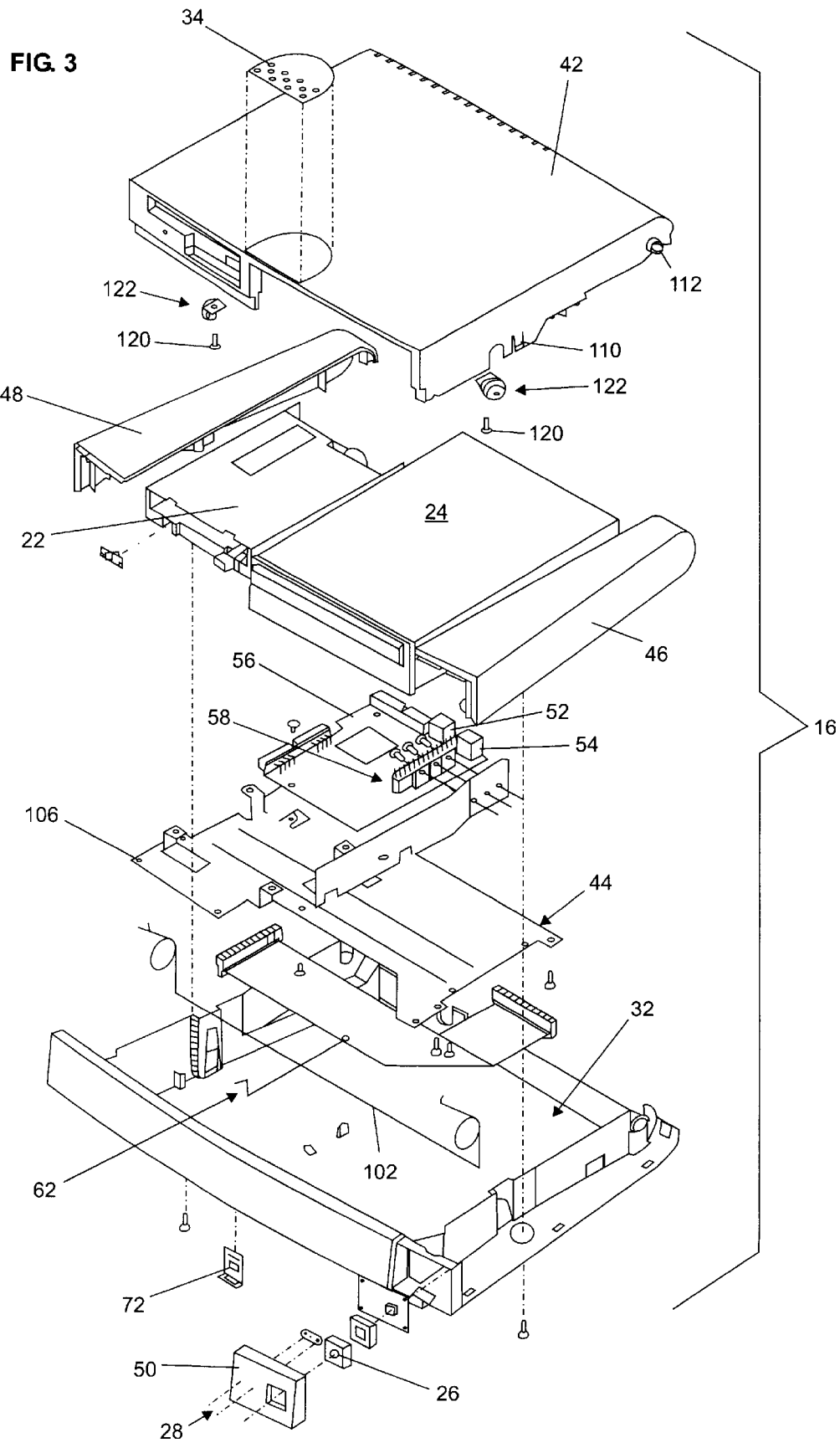
FIG. 3 is an exploded perspective view of certain elements of the media console of FIG. 2 including a base member, drive housing, raise/support mechanism, a latch, electromechanical direct access storage devices and an electronic card, and illustrating certain relationships among those elements.

Referring now to FIG. 3, there is shown a schematic diagram of the elements which make up the media console 16. As shown therein, the media console 16 includes a movable top cover 42 which cooperates with a base member 32 in defining an enclosed, shielded volume for receiving electrically powered data processing and storage components for processing and storing digital data. More specifically, the storage components include floppy disk drive 22 and CD ROM drive 24. The floppy disk drive 22 can be a removable medium direct access storage device (DASD) capable of receiving a diskette inserted there into and using the diskette to receive, store and deliver data as is generally known. The CD-ROM drive 24 can be a removable medium direct access storage device capable of receiving a compact disk inserted there into and using the disk to deliver data as is generally known. Alternatively, either the floppy disk drive 22 or CD-ROM drive 24 could be replaced with a digital video disk (DVD) drive. The FDD 22 and CD-ROM drive 24 are mounted on a direct access storage device bracket 44. The DASD bracket 44 is mounted to the top cover 42 such that the drives 22 and 24 will move with the top cover 42. The top cover 42 includes a user push pad 34 and is disposed between right and left wings 46 and 48 respectively.

User access features and indicators such as a power button 26 and various LEDs 28 (e.g., power light indicator, hard disk drive activity indicator) are included in the media console 16 operator panel 50. A standard keyboard port 52 and mouse port 54 exit the rear of the media console 16. A media console electronics card 56 is disposed within the console housing 30 and is coupled to the floppy disk drive 22 and CD ROM drive 24. The card 56 is also connected to multi-conductor cable 20 via connector 58. As will be described in more detail below, the electronics card 56, in cooperation with an interface in the processing unit 18, is used to receive address and data information from the processing unit 18 and to transfer interrupt state information to the processing unit 18.

Figure 4:
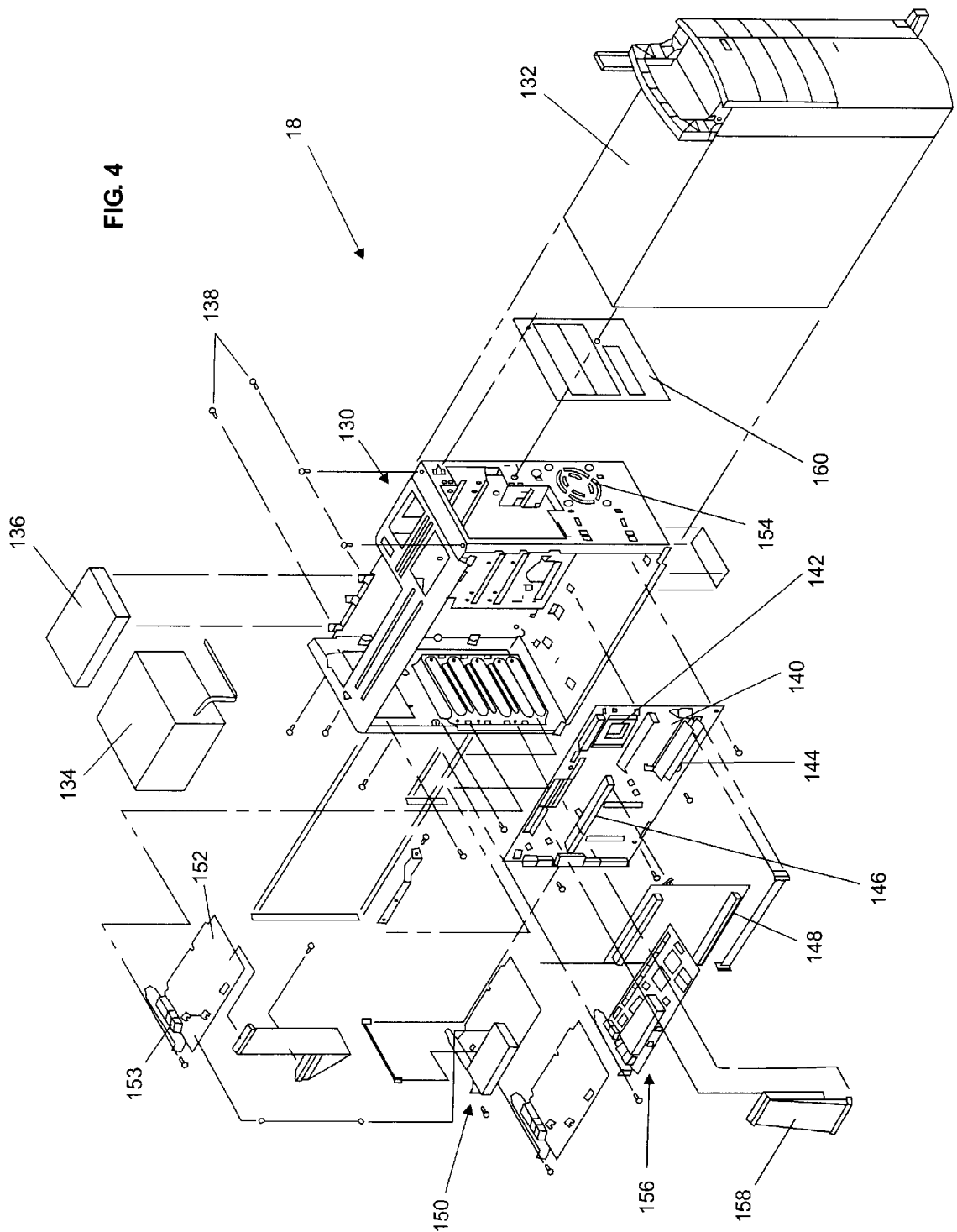
FIG. 4 is an exploded perspective view of certain elements of the processing unit of FIG. 1 including a planar board, CPU, power supply, hard disk drive, ISA interface electronic card and cover, and illustrating certain relationships among those elements.

Referring now to FIG. 4, there is shown a schematic diagram of the tower type system unit 18 of the present invention. As mentioned above, the processing unit 18 is designed to be placed on the floor and contains system components which the user does not need to interact with regularly. More specifically, the system unit 18 contains the remainder of the computer components including a microprocessor, memory, video/graphics subsystem, hard disk drive(s), expansion bus slots (PCI/ISA), expansion drive bays, power supply and fan(s). Accordingly, the processing unit 18 contains all of the high power, bulky and noisy components that the user does not need to interact with. Unless the user chooses to install an accessible drive (like a 5.25" floppy drive or tape backup unit) the processing unit can be completely hidden from view. The multi-conductor electrical cable 20 connecting the processing unit 18 and the media console 16 allows the processing unit 18 to be placed along side, underneath or even behind the desk supporting the media console 16, or in a different room or office than the media console 16.

More specifically, the system unit 18 includes an internal mounting or base chassis assembly 130 disposed within an outer decorative cover 132. Cover 132 has a handle to allow for easy carrying or moving of the tower type processing unit 18. A power supply 134 for supplying power to both the processing unit 18 and the media console 16 is disposed within an upper portion of the assembly 130. A hard disk drive 136 is attached to the top of the assembly 130 by screws 138. The hard disk drive 136 is a fixed medium direct access storage device capable of storing and delivering data as is generally known. A planar 140 is mounted vertically in the right side portion of assembly 130 and includes a central processing unit (CPU) 142, ports 144 for connecting additional RAM memory and a riser card port 146 for connecting a riser card 148. The planar 140 provides a means for electrically interconnecting the components of the computer 10 including those identified above. The system unit 18 also includes a modem/sound card 150 coupled to an expansion bus slot (see FIG. 5B). A host interface card 152 is disposed within the assembly 130 and is coupled between another expansion bus slot and the multi-conductor cable 20. The interface card 152 will be described in more detail below.

System unit 18 also includes a fan (not shown) disposed behind fan vent 154 for cooling the components of system unit 18 such as the CPU 142, graphics controller, hard disk drive 136 and power supply 134. Since the tower or base unit 18 is meant to be placed under a table or desk, the volume of the enclosure is less critical (1) allowing the fan inside to circulate air inside the unit 18 rather than through it allowing for quieter cooling and (2) allowing the unit 18 to be cooled with optional heat pipes (not shown) that bring the heat to outer surfaces of the box.

Figure 5A:
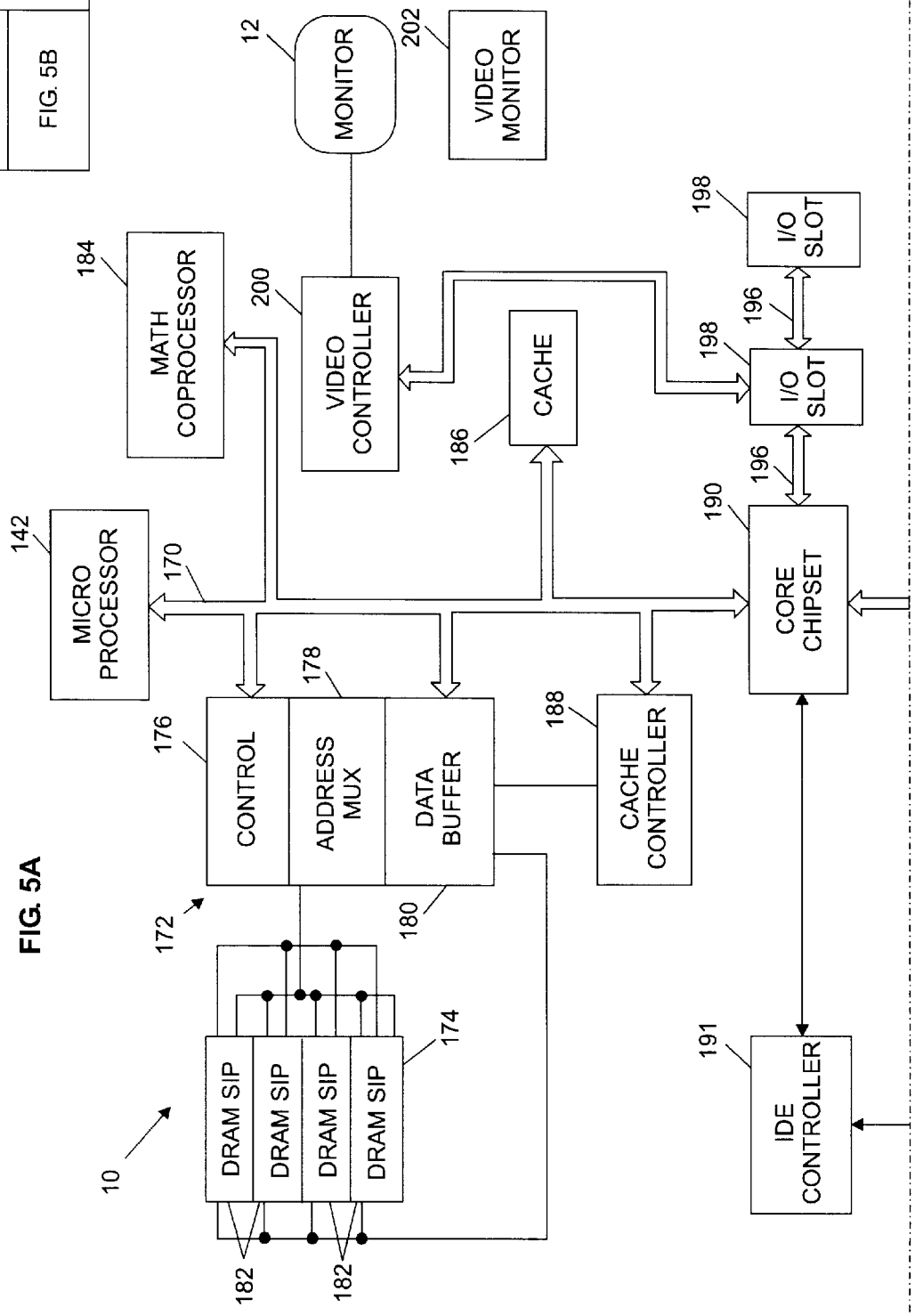
FIGS. 5A, 5B and 5C are a block diagram of certain components of the computer system of FIGS. 1 and 2.

A television card 156 is also disposed within processing unit 18 and coupled to an expansion bus slot (FIG. 5A). The TV card 156 allows standard television signals from a coaxial cable or composite video input to be tuned and subsequently displayed in a window on the monitor 12. A 40 pin ribbon cable 158 is used to couple the output of the TV card 156 to the graphics subsystem. An electromagnetic interference (EMI) shield 160 is disposed between the cover 132 and chassis 130.

The processing unit 18 includes other elements which are conventional and as such are not described herein.

Figure 5B:
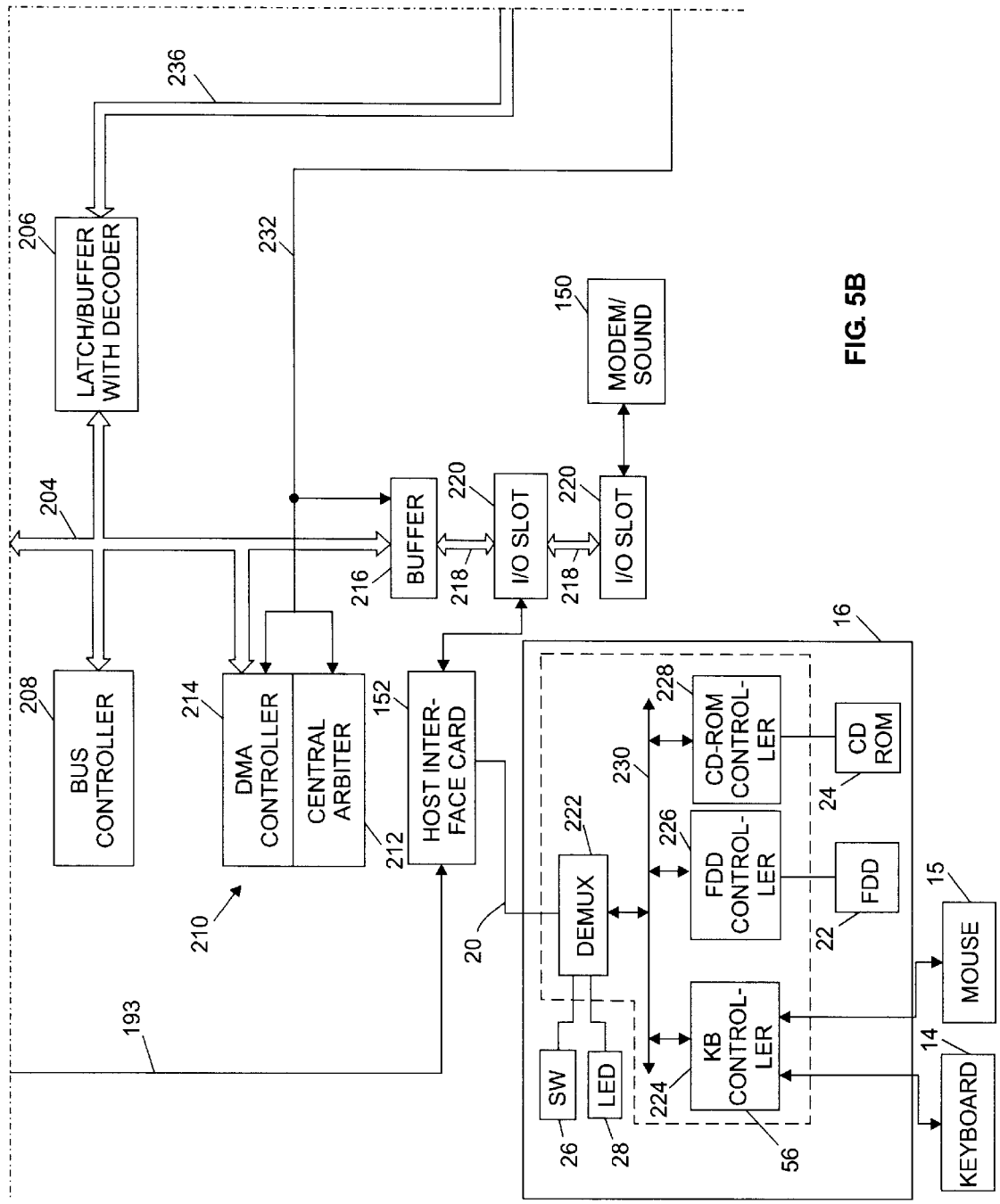
Figure 5C:
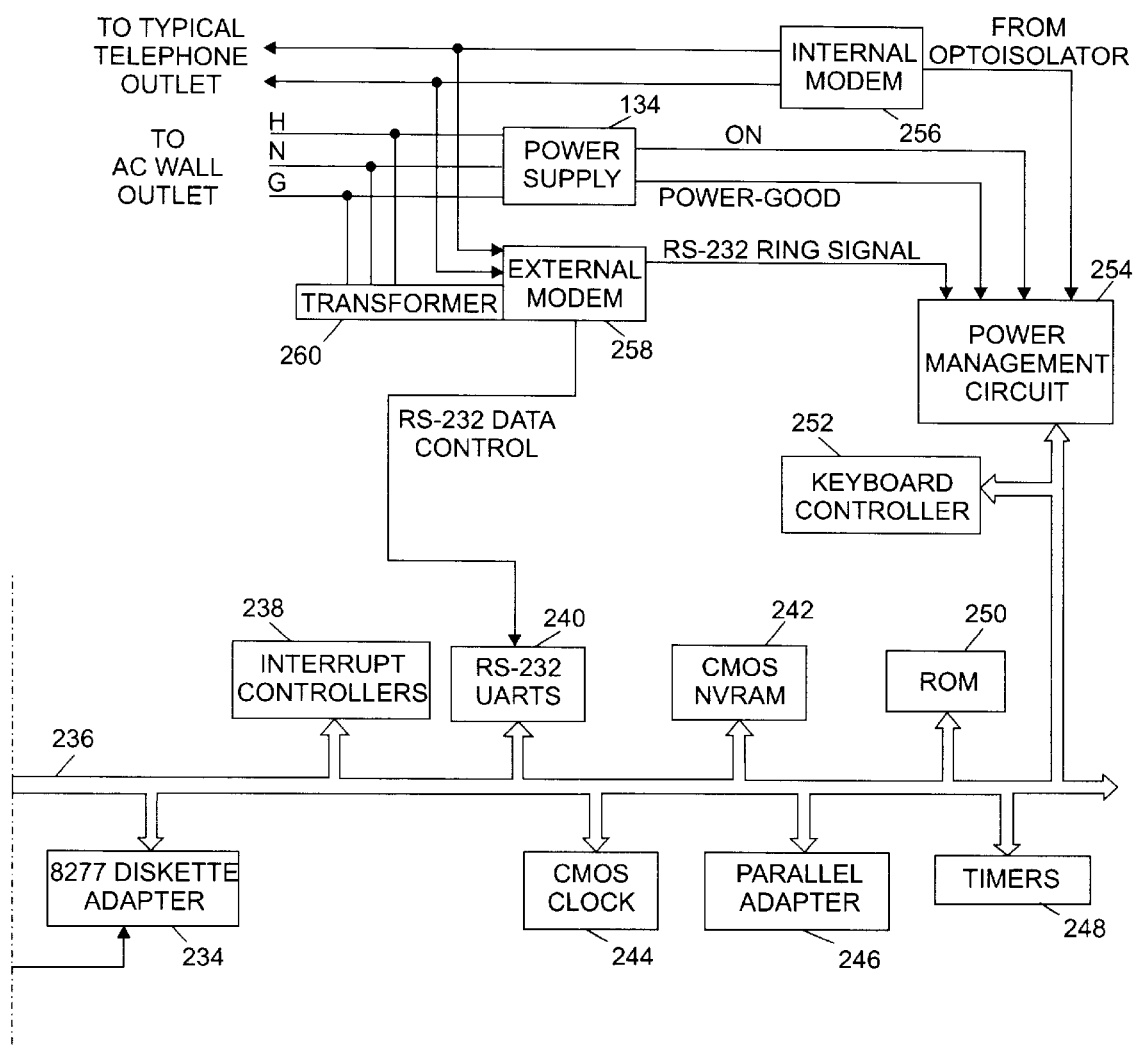

Prior to relating the above structure to the present invention, a summary of the operation in general of the personal computer system 10 may merit review. Referring to FIGS. 5A, 5B and 5C, there is shown a block diagram of a personal computer system illustrating the various components of the computer system such as the system 10 in accordance with the present invention, including components mounted on the planar 140 and the connection of the planar to the I/O slots and other hardware of the personal computer system. Connected to the planar 140 is the system CPU or processor 142 which is connected by a high speed CPU local bus 170 through a memory control unit 172, which is further connected to a volatile random access memory (RAM) 174. The memory control unit 172 is comprised of a memory controller 176, an address multiplexer 178, and a data buffer 180. The memory control unit 172 is further connected to RAM 174 as represented by the four RAM modules 182. The memory controller 176 includes the logic for mapping addresses to and from the microprocessor 142 to particular areas of RAM 174. This logic is used to reclaim RAM previously occupied by basic input output system (BIOS). Further generated by memory controller 176 is a ROM select signal (ROMSEL) that is used to enable or disable ROM.

While the present invention is described hereinafter with particular reference to the system block diagram of FIGS. 5A, 5B and 5C, it is to be understood at the outset of the description which follows that it is contemplated that the apparatus and methods in accordance with the present invention may be used with other hardware configurations of the planar board. For example, the system processor 142 could be an Intel Pentium processor, Cyrix 586-P75 processor or Advanced Micro Devices 8486 processor or any other microprocessor that has a system management interrupt (SMI).

Returning now to FIGS. 5A, 5B and 5C, the CPU local bus 170 (comprising data, address and control components, not shown) provides for the connection of the microprocessor 142, a math coprocessor 184 (if not internal to the CPU 142), a system cache memory 186, and a cache controller 188. Also coupled on the CPU local bus 170 is a core chipset 190 and a bridge chip 191 which includes a peripheral component interconnect (PCI) bridge and an integrated drive electronics (IDE) controller. The core chipset 190 can be an Intel 430VX chip and the bridge chip 191 can be an Intel PIIX3 chip. The PCI bridge within chip 191 provides an interface between the local bus 170 and a PCI bus 196. Connected to the PCI bus 196 are a plurality of I/O slots 198 for receiving peripheral devices, one of which is a video controller 200. The video controller 200 has associated with it a monitor (or video display terminal) 12 and a video memory 202.

The IDE controller in chip 191 provides for the attachment of IDE compatible storage devices such as the fixed disk drive 136 and CD-ROM drive 24 (or a CD-ROM drive in system unit 18 if one is provided). The IDE controller 191 is coupled to the host interface card 152 via an IDE bus 193.

The chipset 190 is itself connected to a slower speed (compared to the CPU local bus 170) system bus 204, also comprising address, data and control components. The system bus 204 extends between the chipset 190 and a buffer 206. The system bus 204 is further connected to a bus control and timing unit 208 and a DMA unit 210. The DMA unit 210 is comprised of a central arbiter 212 and a DMA controller 214. An additional buffer 216 provides an interface between the system bus 204 and an optional feature or expansion bus 218 such as the Industry Standard Architecture (ISA) bus. Connected to the bus 218 are a plurality of I/O slots 220 for receiving ISA adapter cards, one of which is the host interface card 152 (another of which is the modem/sound card 150). Additional ISA adapter cards can be pluggably connected to the I/O slots 220 and may provide additional I/O devices or memory for the system 10. The host card 152 is connected by the multi-conductor cable 20 to the electronic card 56 which is disposed in the media console 16. The host card 152, cable 20 and console electronics card 56 will be described in more detail below. It is sufficient at this point to note that the electronics card 56 includes a de-multiplexer 222 which is coupled to a keyboard controller 224, an 8277 (or compatible) diskette adapter 226 and a second IDE controller 228 via bus 230. The keyboard controller 224, is the slave processor that interfaces with the keyboard 14 and the mouse 15. The de-multiplexer 222 is also coupled to the power switch 26 and the power/feedback LED 28. The keyboard controller 224, FDD controller 226 and IDE controller 228 can all be included in a single super I/O circuit 286 (FIG. 6) such as for example, a SMC37C932 chip.

An arbitration control bus 232 couples the DMA controller 214 and central arbiter 212 to the I/O slots 220 and another diskette adapter 234.

While the microcomputer system 10 is shown with a basic 8 megabyte RAM module 174, it is understood that additional memory can be interconnected as represented in FIGS. 5A, 5B and 5C by the addition of optional higher-density memory modules 182. For purposes of illustration only, the present invention is described with reference to the basic eight megabyte memory module.

A latch buffer and decoder 206 is coupled between the system bus 204 and a planar I/O bus 236. The planar I/O bus 236 includes address, data, and control components respectively. Coupled along the planar I/O bus 236 are a variety of I/O adapters and other components such as the diskette adapter 234, an interrupt controller 238, an RS-232 adapter 240, nonvolatile CMOS RAM 242, also herein referred to as NVRAM 242, a CMOS real-time clock (RTC) 244, a parallel adapter 246, a plurality of timers 248, the read only memory (ROM) 250, the keyboard controller 252, and the power management circuitry 254. The keyboard controller 252, FDD controller 234, FDD 235, RS-232 adapter 240 and parallel adapter 246 can all be included in a single super I/O circuit. The keyboard controller 252 and diskette adapter 234 are duplicated in the media console 16 in order to allow additional diskette drives or tape drives to be installed in the system unit 18 (via 234), or the keyboard and mouse can be plugged into the system unit 18 instead of the console 16 (via 252). In addition, the duplication allows the same planar to be used without such a console 16. The power management circuitry 254 is in circuit communication with the power supply 134, the switch 26, the power/feedback LED 28, and an internal modem 256 and/or an external modem 258. The external modem 258 is typically connected to a transformer 260, which is connected to a typical wall outlet, as is known to those skilled in the art. The modems 256, 258 are connected to a typical telephone outlet.

The read only memory 250 includes the BIOS that is used to interface between the I/O devices and the operating system of the microprocessor 142. BIOS stored in ROM 250 can be copied (shadowed) into RAM 174 to decrease the execution time of BIOS. ROM 250 is further responsive (via ROMSEL signal) to memory controller 176. If ROM 250 is enabled by memory controller 176, BIOS is executed out of ROM 250. If ROM 250 is disabled by memory controller 176, ROM is not responsive to address inquiries from the microprocessor 142 (i.e. BIOS is executed out of RAM).

The real-time clock 244 is used for time of day calculations and the NVRAM 242 is used to store system configuration data. That is, the NVRAM 242 will contain values which describe the present configuration of the system 10. For example, NVRAM 242 contains information describing the capacity of a fixed disk or diskette, the type of display, the amount of memory, time, date, etc. Furthermore, these data are stored in NVRAM 242 whenever a special configuration program, such as SET Configuration, is executed. The purpose of the SET Configuration program is to store values characterizing the configuration of the system to NVRAM 242.

The interface card 152, multi-conductor cable 20 and media electronics card 56 will now be described with reference to FIGS. 6–11. The ISA/IDE interface card 152 allows IDE controller 228, FDD controller 226 and 8042 keyboard controller 224 to be used in the media console 16. The ISA/IDE card 152 which is plugged into the base system unit 18 can be programmed to decode certain ranges of I/O addresses. The BIOS ensures that the proper I/O ranges for the devices in the console 16 ("split" devices) are enabled and that possibly conflicting planar devices are disabled. When the interface card 152 detects a valid ISA cycle (input/output (I/O) or direct memory access (DMA)) for a split device or a valid IDE cycle (I/O or DMA) for CD-ROM drive 24, it intercepts the cycle and issues the ISA or IDE cycle to the media console 16 electronics card 56 which responds to the ISA or IDE cycle.

A multiplexing scheme was developed to multiplex address, data, and interrupts in order to keep the number of signals in the cable 20 to a reasonable number. In addition to the multiplexed I/O signals, some other signals had to be brought up independently-auxiliary 5 volts, the power light indicator signal, and the power switch signal. These signals must be separate because they must be active even when the main power is off.

The present invention provides a generic ISA/IDE bus I/O extender interface that minimizes the number of signals needed to transfer data, address and interrupts between devices in the console 16 and devices in the system unit 18. In addition, the present invention allows the media console 16 electronics to be based around a super I/O device 286 that contains the IDE, FDD and keyboard controllers 228, 226 and 224 respectively. In addition, new devices could easily be added simply by adding the appropriate decode range to the base card and adding the ISA or IDE device to the media console 16 with no changes to the cable 20 protocol.

Figure 6:
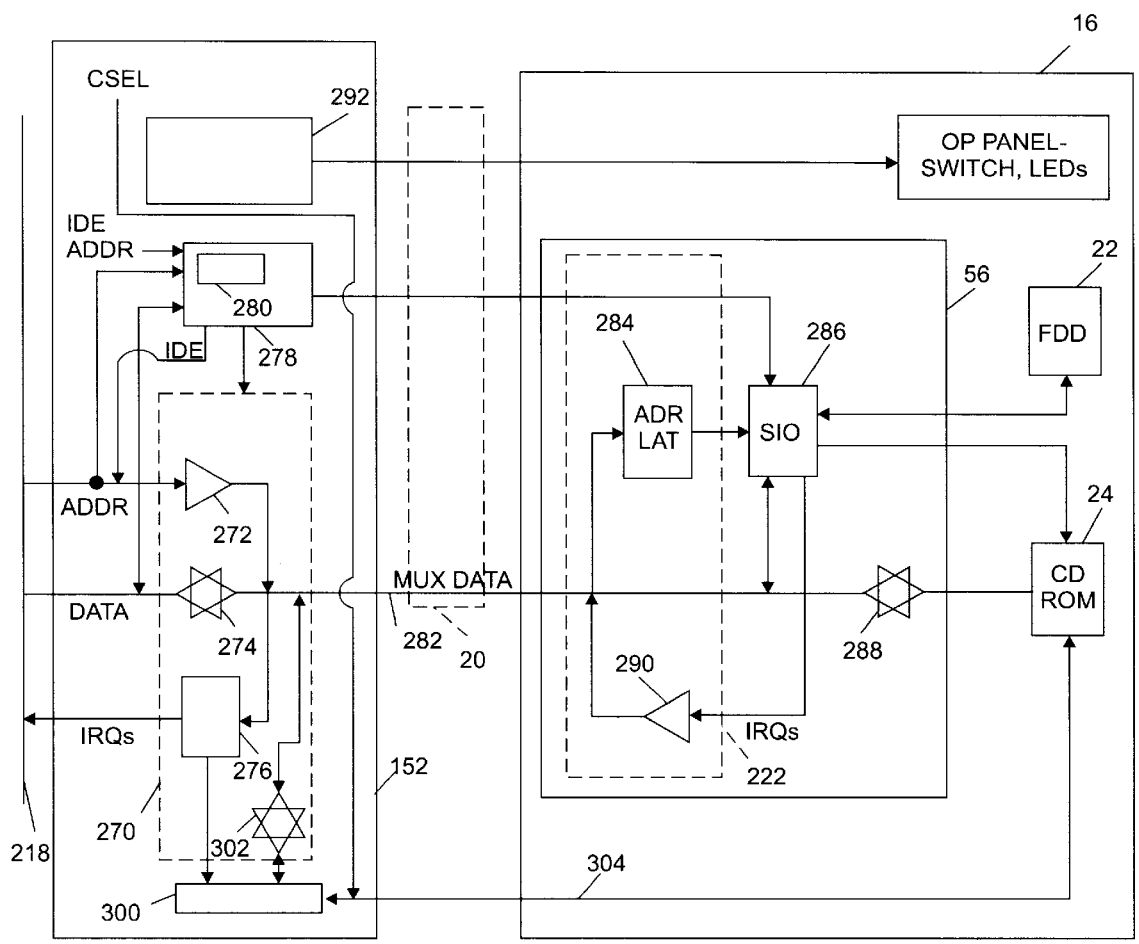
FIG. 6 is a schematic block diagram of the ISA/IDE interface electronic card, cable and media console electronic card of the present invention.

Referring now to FIG. 6, there is shown a schematic diagram of the ISA/IDE interface card 152, the media card 56 and the coupling therebetween via the multi-conductor cable 20. The interface card 152 includes a multiplexer 270 for multiplexing addresses from the ISA bus 218 or IDE bus 193, data to/from the ISA bus 218 or the IDE bus 193 and interrupt requests (IRQs) from the console 16 to the ISA bus 218 or IDE bus 193 respectively. Multiplexer 270 includes a tristateable address driver 272 coupled to the address signals of ISA bus 218 and the IDE address signals output by control circuit 278, a tristateable transceiver 274 coupled to the data signals of ISA bus 218 and an IRQ latch 276 coupled to the control portion of ISA bus 218 and IDE bus 193 (via connector 300). A sequencer or control circuit 278 is coupled to the address and data signals of the ISA bus 218, IDE bus 193 and multiplexer 270. Configuration registers 280 are used by BIOS to enable the appropriate I/O address ranges and DMA channels for the sequencer 278 to pass through to the media console 16. A description of the registers 280 and an unlocking/locking sequence is described below.

The sequencer 278 constantly monitors the ISA bus 218 and IDE bus 193 waiting for I/O or DMA cycles that it must act upon. During bus idle times, the address signals are constantly driven through the multi-conductor cable 20 to the media console 16. When the sequencer 278 detects an I/O cycle that needs to be passed through to the media console 16, the address enable signal (ADR_EN) is de-asserted to latch the address into the media console 16 and tristate the cable data bus 282 (MUX DATA). Next, the data enable (DAT_EN#) is asserted to enable the data transceivers to pass the data to/from the media console 16 across the multi-conductor cable data bus 282.

At the end of each I/O and DMA cycle (even those not decoded) as well as memory refresh cycles, the sequencer 278 samples the 8 IRQ signals that the media console 16 is capable of generating (IRQs 1, 3, 6, IDE_IRQ, 11, 12,14 and 15). The media console 16 was designed to only generate 8 IRQs and allow a single byte to be transmitted. It should be understood that the media console 16 could be designed to generate 16 IRQs but this would increase cost. The 8 IRQs chosen are typical ones used by the devices in the console 16 (e.g., IRQ1 for the keyboard 14, IRQ6 for the floppy disk drive 22, IRQ 12 for the mouse 15 and IDE_IRQ for the CD-ROM drive 24. Extra IRQs (IRQs 3, 11, 14 and 15) are included to allow a Plug-n-Play operating system to reconfigure the IRQs. The sequencer 278 activates the IRQ strobe signal (IRQ_STRB#) for one clock cycle. In response to this signal, the media console 16 drives the current state of the interrupts onto the cable data bus 282. The IRQ latch 276 then latches the interrupt states and drives them onto the ISA and IDE channel with open collector drivers. This IRQ cycle overlaps the ISA and IDE bus I/O recovery time so that there is no performance penalty. No interrupts are lost since all devices generate interrupts in a level triggered fashion. An interrupt never occurs as a short pulse as they are always latched by the generating device and it requires action by the CPU 142 (usually reading a status I/O port) to clear the IRQ.

The electronics card 56 in the media console 16 is an I/O bus demultiplexer. The demultiplexer 222 includes an address latch 284 for latching the addresses from the base card 152. A super I/O device (SIO) (e.g., SMC 37C932) 286 is coupled to the address latch 284, the FDD 22, the CD-ROM 24, the sequencer 278, the tristateable transceiver 288 and the IRQ tristateable buffer 290. As noted above, the SIO device 286 contains the diskette adapter 226 and IDE disk controller 228 for the floppy disk drive 22 and CD-ROM drive 24 respectively. The IDE controller 228 is only used for generating addresses to the CD-ROM drive 24. Data is provided directly from the IDE bus 193 to CD-ROM drive 24 via IDE port 300 and cable 20. The demultiplexer 222 is a slave to the sequencer 278 in the base card 152. More specifically, the demultiplexer 222 responds to the address enable (ADR_EN) and data enable (DAT_EN#) signals generated by the sequencer 278 and the IRQ strobe (IRQ_STRB#) signal also generated by the sequencer 278 to latch/drive the appropriate signal groups.

The output of the demultiplexer 222 is a pseudo ISA bus in that it does not support all I/O addresses, memory cycles, master cycle etc. but rather only carries certain I/O address ranges. In addition, this pseudo ISA bus only carries 1 DMA channel and 8 IRQ signals. The 8 IRQs were chosen to be sufficient for the devices currently in the console 16 and allow upgrades as well with the unused IRQs. Of course, more DMA channels and IRQs would require more conductors in the cable 20. The setup and hold timings for the pseudo ISA bus are slightly more stringent than the ISA bus 218. The timing restrictions are due to the additional propagation delays through the buffers and cable 20. The super I/O integrated circuits available today have much less setup and hold specifications than the original ISA bus allowed for. This allows the split system 10 of the present invention to operate with no additional wait states.

The host interface card 152 is configured to pass the appropriate I/O addresses through to the media console 16. In addition, the console 16 is programmed to respond to the appropriate addresses as well. It should be noted that interrupt request levels do not need to be programmed as they are automatically passed through from the media console as they are generated. This is possible because they are driven back to the ISA bus 218 and IDE bus 193 using open collector drivers (i.e., output of IRQ latch 276).

The sequencer 278 is configured through a pair of 8 bit I/O ports or registers 280 within sequencer 278; a first I/O port (CFG_ADDR) at address 370H and a second I/O port (CFG_DATA) at address 371H. The CFG_ADDR register is a write only register which is used to open and close the configuration space and to select one of the configuration registers. Bits 0–3 of this register are Index bits and bits 4–7 are unused. The CFG_DATA register is a read/write register used to access the configuration register currently specified by CFG_ADDR. Bits 0–3 of this register are used for data and bits 4–7 are unused.

The configuration registers are unlocked by writing the following sequence to the CFG_ADDR register: "0DH", "0CH". The logic within sequencer 278 enters the first stage of the unlock sequence after the "0DH" is received. It is important that the "0CH" be received immediately afterwards because any other output cycle (even to another I/O port) will reset the lock. Once unlocked, the configuration registers 280 can be accessed until the locking key ("0FH") is received. Also when the configuration is unlocked, any configured decodes are disabled.

The following configuration registers 280 are used to select the appropriate I/O and DMA cycles to route through to the media console 16:

| IDE_MISC | index 0 | Default = 0 |
| --- | --- | --- |
| | Bit 0 | 0 - Disable IDE_IRQ |
| | | 1 - Enable IDE_IRQ |
| | Bit 1 | Reserved |
| | Bit 2 | Enable programmed I/O ranges. "0" means computer system is off. |
| FDD_DCD | index 1 | Default = 0 |
| | Bit 0 | Enable FDD1: 3F0H–3F7H |
| | Bit 1 | Enable FDD2: 370H–377H |
| | Bit 2 | Enable SMI generation on write to FDD control port. This bit is cleared when the SMI occurs. This bit also enables shadow writes to the FDD1 address range even when bit 0 = 0. |
| DMA_ACK | index 2 | Default = 0 |
| | Bit 1..0 | 00 - Enable no DACK cycles |
| | | 01 - Reserved |
| | | 10 - Reserved |
| | | 11 - Enable DACK2 cycles |
| | Bit 2 | Enable all I/O address ranges (use for configuration only). |
| KBM_DCD | index 3 | Default = 0 |
| | Bit 0 | Enable 8042 I/O address ranges. This bit also automaticalty enables SMIs for CPU reset/A20 emulation (SMI occurs for writes of X1, XC, XD, XE, |
| | Bit 1 | XF to control port of keyboard controller 224 (port 64H)). The bit is cleared when the SMI occurs. Enable SMIs on writes to data port of keyboard controller 224 (port 60H). The bit is cleared when the SMI occurs. |

As noted above, the host interface card 152 also includes an IDE port 300 which connects to an IDE port on planar 140 using a standard 40-pin ribbon cable (not shown). In addition to the ISA data and addresses, IDE data and addresses are multiplexed to the MUX DATA bus 282 across the cable 20 to the media console 16. More specifically, multiplexer 270 further includes a tristateable transceiver 302 coupled to the IDE data signals from IDE port 300. In addition, IDE address signals are coupled to the control circuit 278.

When an IDE cycle is decoded by the host logic controller 278, it first passes a predefined IDE address (e.g., 1FxH or 3F6H) to the media console 16. Because the SIO controller 286 is programmed to decode these addresses in its IDE controller 228, the SIO 286 locally generates IDE address signals to the CD-ROM drive 24. The host logic controller 278 then passes the appropriate control signals through the cable 20 to the media console 16 to transmit the data to complete the IDE cycle (I/O or DMA). The SIO 286 also takes interrupts locally from the CD-ROM drive 24 and passes them to the host card 152 on the MUX DATA bus 282 during IRQ strobe cycles. The IDE_IRQ signal is defined on the IDE bus 193 and it gets mapped to an IRQ level in the chip 191. This IRQ data bit from the CD-ROM drive 24 is then directed to the IDE port 300 on the host card 152 and is passed to the IDE controller 191 via the IDE bus 193.

There are also some signals applied directly from the IDE port 300 to the CD-ROM drive 24 illustrated by connection 304. These signals include the following:

| PDIAG# | Indicates to a Master drive whether the Slave drive has passed power on diagnostics; |
| --- | --- |
| DASP# | Indicates to a Master drive that a Slave drive is present; |
| CSEL | Indicates the Master/Slave selection to the CD-ROM dirve 24; |
| IDE_DRQ# | Indicates the CD-ROM drive 24 is ready to do a DMA transfer; and |
| IDE_DACK# | Indicates the IDE controller 228 is ready to do a DMA transfer. |

The present invention utilizes a 14.3 MHZ ISA bus clock signal input to control circuit 278 for the time base instead of a standard 8 MHZ ISA clock. The state machine (described below) has been written to support a 70 ns clock period instead of a 125 ns clock period for synchronous events.

To provide full IDE function for the CD-ROM drive 24, the drive 24 is capable of acting as either a Master or Slave device. If the drive 24 is a Master, a Slave drive is not required in the system unit 18. If the drive 24 is a Slave, the system unit 18 must contain a Master IDE drive (e.g., hard drive) on the same IDE port.

Since it is difficult for a user to access the CD-ROM drive 24 inside the media console 16, it is necessary to use a Cable Select implementation instead of the conventional Master/Slave jumper settings. The CSEL (Cable Select) signal is passed through the cable 20 from the host card 152 to the CD ROM drive 24 via connection 304. The host card 152 contains a jumper to select the Master or Slave setting for the CD-ROM drive 24. When the Master position is selected, the CSEL signal remains low at power on and when the Slave position is selected, the CSEL signal is pulled high. The CD-ROM drive 24 must be jumpered for Cable Select instead of for Master. This jumper setting causes the drive 24 to sample the CSEL signal at power on and to then act accordingly as a Master or Slave device.

The host card logic controller 278 also has to be aware of the Master/Slave setting for the drive 24 in order to decode only the IDE cycles that are intended for the drive 24. Therefore, the logic controller 278 requires the following:

Both Master# and Slave# signals are transmitted from the jumpers on the host card 152 to the controller 278. Only one of these signals should be active at any time, and they should not change while power is applied to the system. These signals indicate to the controller 278 which device accesses it should transmit to/from the CD-ROM drive 24 in the media console 16.

The IDE address bus, write signal, and data bit 4 are wired from the IDE port 300 on the host card 152 to the logic controller 278. The logic controller 278 passes all I/O writes that are not to the Data register (normally I/O port 170H for the secondary IDE devices) in order for the CD-ROM drive 24 to detect drive select writes and commands that require both drives to respond.

Whenever the CD-ROM drive 24 is selected by an I/O write to the Drive/Head register (normally 110 port 176H), the logic controller 278 sets a data latch to indicate that it should pass all IDE cycles to/from the IDE port 300 on the host card 152 to/from the CD-ROM drive 24 in the media console.

When the CD-ROM drive 24 is paired with a drive (e.g., hard drive 136) in the system unit 18 on the same IDE connector, it must be capable of executing the power on handshaking sequence required to make both drives accessible to the system. The two possible scenarios are as follows: (1) When the CD-ROM drive 24 is a Master, it must first sample the DASP# signal from the cable 20 to see whether a Slave drive is present. If so, the drive 24 must then sample the PDIAG# signal to see whether the Slave drive passed its power on diagnostics. The CD-ROM drive 24 reports the status of the Slave drive's diagnostics to system software when requested. (2) When the CD-ROM drive 24 is a Slave, it must assert the DASP# signal at power on in order to inform the Master drive of its presence. After completing power on diagnostics, the drive 24 asserts the PDIAG# signal to indicate good diagnostics status. The Master drive reports the status of the CD-ROM drive's 24 diagnostics to system software when requested to do so.

In order to support IDE cycles in addition to ISA cycles, the host card logic controller 278 utilizes an arbitration state machine to keep track of which type of cycle needs to be executed at a given time. The arbitration state machine contains three states, which are defined as follows:

isa_gnt signifies that any type of ISA cycle (I/O or DMA) is being executed. This is the default state and is qualified by an I/O address for any of the media console ISA devices (diskette drive 22, keyboard 14, mouse 15) or by the ISA bus DACK2# signal for a diskette drive DMA cycle;

ide_gnt signifies that an IDE I/O cycle is being executed. This state is qualified by an I/O write to any IDE register other than the data register (usually 170H), or by any I/O read or write to any IDE register when the CD-ROM drive 24 has been selected by setting the proper state of bit 4 of the drive/head register; and dma_gnt signifies that an IDE DMA cycle is being executed. This state is qualified by the assertion of the IDE_DRQ# signal from the CD-ROM drive 24 in the media console 16.

The bits of the arbitration state machine are used in the control state machine to ensure the proper number of wait states, active read or write pulses, and interrupt cycles are executed for the particular type of transfer. Whenever the arbitration logic calls for a change of state, it asserts an internal MASTER_CHG signal that is active for one clock cycle inside the logic controller 278. When the control state machine detects the MASTER_CHG signal, it reverts to its initial state and begins the new type of cycle.

In order to respond correctly to both types of IDE cycles, the host logic control state machine allows the host card 152 to generate addresses, wait states, and control signals at the proper times as data is passed between the media console 16 and the system planar 140.

After the arbitration state machine qualifies the ide_gnt state for an IDE I/O cycle, the control state machine goes through the following sequence:

While waiting in the idle state, the host logic 278 detects the IDE read or write pulse and de-asserts the IDECHRDY signal to force the system board IDE controller 191 to keep the pulse active. The host logic also generates the IDE port address (1FxH or 3F6H) to be transmitted to the media console 16 via the MUX DATA bus 282.

In the wait0 state the ADR_EN signal is de-asserted to latch the address in the media console 16.

In the wait1 state the logic removes the address from the MUX DATA bus 282 and asserts the IDE_DAT_EN# signal, which enables the IDE data buffers 302 on the host card 152.

In the wait2 state the logic asserts the DAT_STRB# signal, which is used by the console 16 along with R/W# to generate a read or write signal.

In the active state the logic asserts the IDECHRDY signal to allow the IDE controller 191 to hold the read or write pulse for the remainder of the specified time.

In the active state the logic continues to propagate the read or write pulse to the media console 16 to allow the CD-ROM drive 24 time to put the data on the MUX DATA bus 282. During this state the IDE controller 191 is expected to de-assert the read or write pulse and latch the data that propagated from the MUX DATA bus 282 to the IDE buffers on the host card 152. The logic remains in the activeb state for one full clock cycle after the read or write pulse (and DAT_STRB#) has been de-asserted.

In the irq1 state the logic asserts the IRQ_STRB# signal, which disables the IDE buffers on the host card 152 and enables the IRQ data buffer 276.

In the irq2 state the logic continues to assert the IRQ_STRB# signal to allow the interrupt data to propagate from the media console 16 to the MUX DATA bus 282 and into the IRO data buffer. The interrupt data lines are routed to the ISA and IDE connectors to appear as edge-triggered interrupts.

In the around state the logic de-asserts the IRQ_STRB# signal and the interrupt data are removed from the ISA and IDE connectors.

In the re-enable state the logic is ready to propagate another address to the MUX DATA bus 282. If no MASTER_CHG signal is detected, the logic returns to the idle state to wait for another cycle to begin.

After the arbitration state machine qualifies the dma_gnt state for an IDE DMA cycle, the control state machine goes through the following sequence:

In the re-enable state, the host logic internally generates the IDE port address (1F0H). At this point the CD-ROM drive 24 has asserted the IDE_DRQ# signal and is waiting for the DMA transfer to begin.

In the idle state the logic puts the IDE data port address on the MUX DATA bus 282.

In the wait0 state the ADR_LAT signal is de-asserted to latch the address in the media console 16.

In the wait1 state the logic removes the address from the MUX DATA bus 282 and asserts the IDE_DAT_EN# signal, which enables the IDE data buffers on the host card 152.

In the wait2 state the logic asserts the DAT_STRB# signal, which is used by the media console 16 along with R/W# to generate a read or write signal.

In the active state the logic asserts the DMA_REQ signal to system board 140 to indicate it is ready to start the DMA transfer.

In the activeb state the logic holds the IDE_DAT_EN#, DAT_STRB#, and DMA_REQ signals active to allow the IDE controller 191 to generate DMA data transfers by generating read pulses while holding DMA_ACK# active. The data words pass from the media console 16 through the MUX_DATA bus 282 to the IDE controller 191.

The logic remains in the activeb state for the duration of the DMA transfer, except that during every other ISA refresh cycle (about every 30 microseconds) it generates an IRQ strobe cycle to pass interrupts from media console ISA devices (particularly the mouse 15). To suspend the DMA transfer during the IRQ cycle, the logic de-asserts the DMA_REQ signal and continues with the DMA transfer in the activeb state.

When the CD-ROM drive 24 in the media console 16 de-asserts the IDE_DRQ# signal to indicate the DMA transfer is complete, the logic exits the activeb state and returns to the re-enable state. At this point, the arbitration logic generates a MASTER_CHG signal to begin either an ISA cycle or an IDE I/O cycle. (It is not possible for the system to generate two consecutive IDE DMA cycles without IDE I/O cycles in between.)

Figure 7:
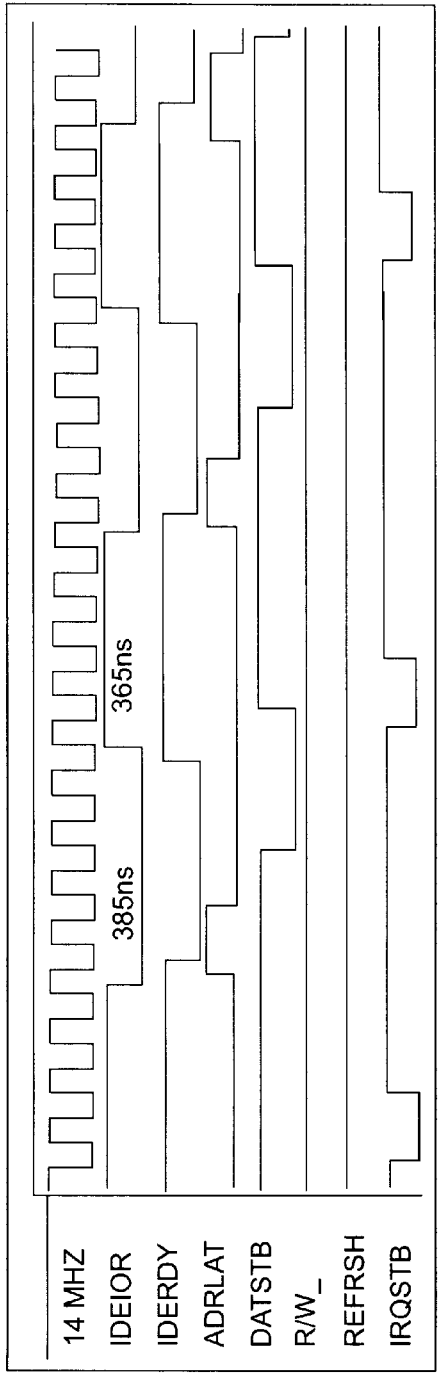
FIG. 7 is a cycle timing diagram of two IDE I/O read cycles between the IDE interface in the system unit and the CD-ROM drive of the media console via the connecting electrical cable.

Turning now to FIG. 7, there is shown a cycle timing diagram of two typical 16 bit IDE I/O read cycles in accordance with the present invention. The cycle timing is characteristic of a block read of data from the CD-ROM 24. Although IDE I/O cycle times are dependent upon the IDE controller 191, system board CPU speed, PCI bus speed and device driver implementation, the typical I/O cycle time for an IDE I/O read cycle with a 166 MHZ CPU and a 33 MHZ PCI bus is about 750 ns. This provides a maximum transfer rate (at 16 bits per cycle) of about 2.7 MB/s or 18X CD-ROM performance.

Figure 8:
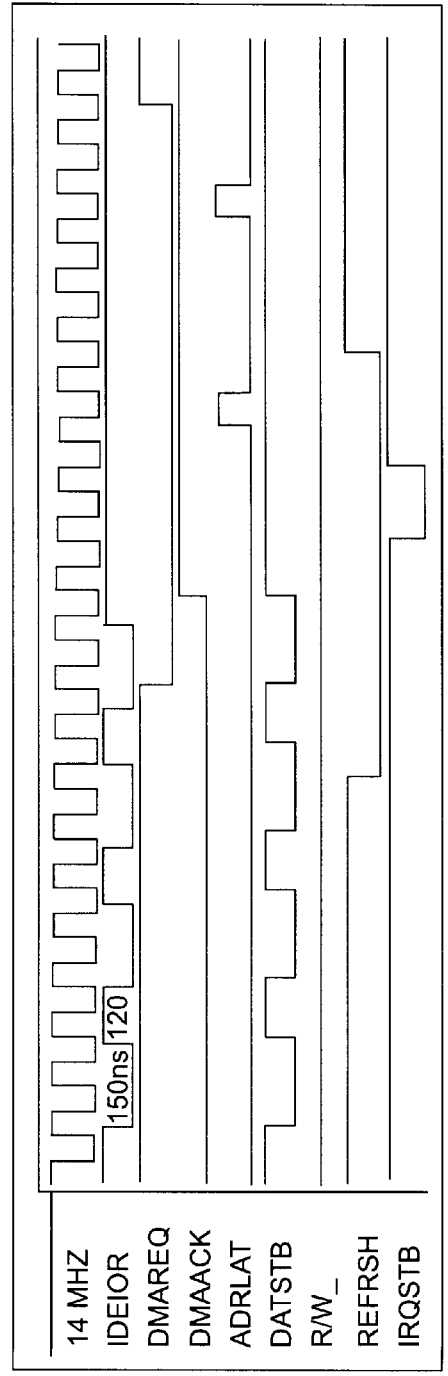
FIG. 8 is a cycle timing diagram of four IDE DMA read cycles between the IDE interface in the system unit and the CD-ROM drive of the media console via the connecting electrical cable.

Turning now to FIG. 8, there is shown a cycle timing diagram of four typical 16 bit IDE DMA read cycles followed by an IRQ strobe cycle in accordance with the present invention. The cycle timing is characteristic of a block read of data from the CD-ROM 24. The IDE DMA cycle times are dependent upon the IDE controller 191, device driver implementation and the PCI bus speed, the typical DMA cycle time for an IDE DMA read cycle with a 33 MHZ PCI bus is about 270 ns. This provides a maximum transfer rate (at 16 bits per cycle) of about 7.4 MB/s or 49X CD-ROM performance.

The system POST/BIOS has been modified to support the present invention. POST programs the SIO controller 286 in the media console 16 to respond to I/O addresses 1FxH and 3F6H and to pass IDE interrupts on IRQ9. POST is also operative to detect whether a CD-ROM drive is in the media console 16 or is connected directly to the planar 140. If the drive is present in the media console 16 then POST will perform the following:

(1) Set the local bus IDE controller 191 to generate slower cycles than would normally be used for that device (e.g., 270 ns instead of 120 to 1 80 ns);

(2) Set up the local bus IDE controller 191 to acknowledge the IDECHRDY signal from the host card 152, which is used to lengthen I/O cycles to the CD-ROM drive 24; and (3) Set bit 0 of the IDE_MISC configuration register in the host logic controller 278. This bit is used internally by the host logic to indicate it may generate the DMA_REQ signal to the system board IDE controller 191.

POST is also operative to program the CD-ROM drive 24 in the media console 16 to generate I/O cycles without IDECHRDY support since the IORDY signal from the media console 16 is not passed through the cable 20 to the host card 152. Instead, logic controller 278 generates IDECHRDY as needed to ensure the IDE controller 191 gives the CD-ROM drive 24 time to respond to I/O cycles.

The BIOS system management interrupt (SMI) handler is operative to accommodate interruptions to DMA transfers from the CD-ROM drive 24. If the SMI handler detects an SMI was generated by the host card 152, it clears bit 0 of the IDE_MISC configuration register. If an IDE DMA cycle is in progress when the SMI occurs, clearing bit 0 of IDE_MISC causes the host logic to de-assert the DMA_REQ signal to suspend the DMA transfer. This is used to allow the SMI handler to access other devices in the media console 16 during the SMI. The system BIOS returns bit 0 of IDE_MISC to its original state before exiting from the SMI handler to allow the DMA transfer to continue.

By providing a system and method for operating the CD-ROM drive 24 in the media console 16 through a connection to the local bus IDE controller 191 on the planar 140 in the system unit 18, the present invention provides increased performance through decreased cycle times. In addition, the present invention allows the local bus IDE controller 191 to transfer data through DMA data transfers which allows the CPU 142 to perform other tasks at the same time the IDE controller 191 performs data transfers.

The main connections between the interface card 152 and the planar 140 are the ISA and IDE buses 218,193 respectively. All ISA and IDE bus signals used are buffered appropriately so that the cable 20 and media console 16 do not adversely affect the bus loading. There are a few other signals that must be picked up from sources other than the ISA and IDE buses. As noted above, these signals include AUX5, the power light indicator signal and the power switch signal. There is also an SMI_GEN signal which is used to generate an SMI from the interface card 152. The red book audio interface from the CD-ROM 24 is included in the cable 20 and made available on the interface card 152. The connector has been chosen such that the same cable that is currently used to connect the CD and sound card can be used between the interface card 152 and sound card. Various other signals are required from the planar. Many of these are available through existing planar connections. However, to reduce the number of discrete jumper cables required and ease assembly of the system unit 20, all necessary signals have been incorporated into a single 10 pin (2X5) connector on the planar 140 which is connected to connector 292 on the host card 152. Each of the signals of the 10 pin connector along with its function description is shown in the table of FIG. 9.

Figure 10:
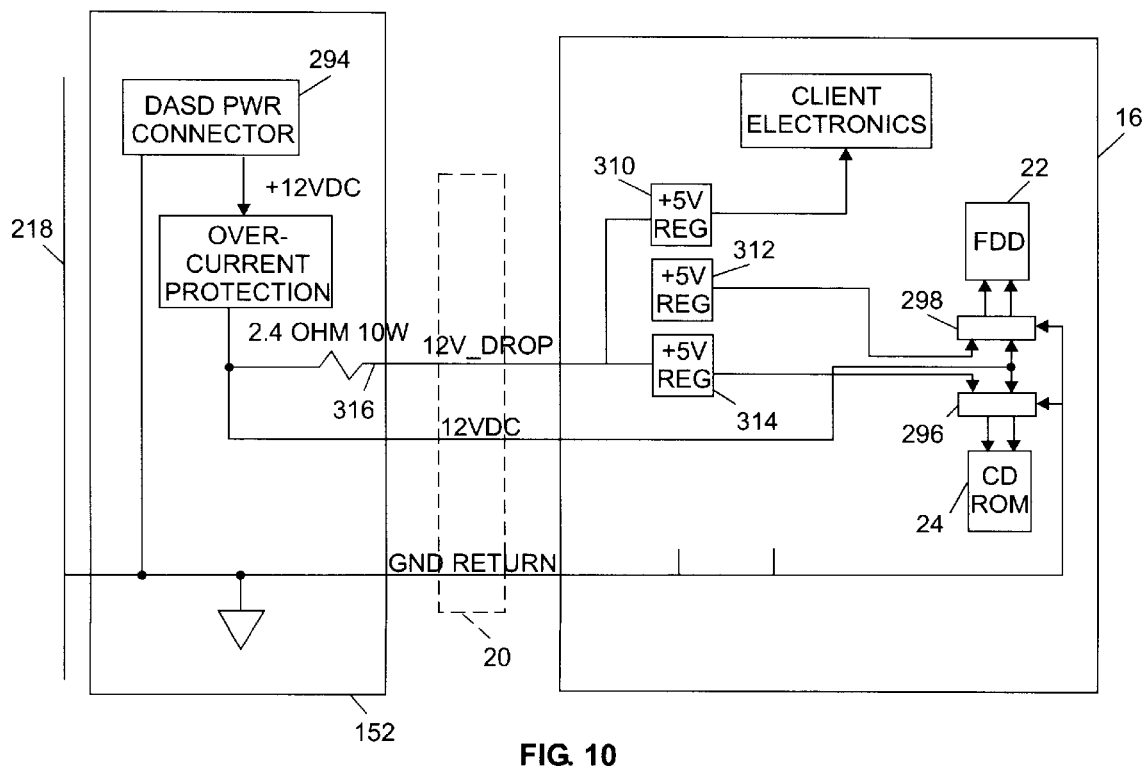
FIG. 10 is a schematic diagram of the power distribution between the ISA/IDE interface card and media console electronics card of the present invention.

Turning now to FIG. 10, there is shown a power distribution between the host interface card 152 and media electronics card 56 of the present invention. Since the media console 16 is powered through the multi-conductor cable 20, the necessary voltage (+12VDC) is obtained by using one of the large DASD connectors 294 from the power supply. This avoids the potential problem of pulling too much current through the ISA edge connector. The number of available DASD connectors should not be an issue because the CD-ROM 24 is not located in the base unit 18 of the split system 10. The power voltages that exit the system through the multi-conductor cable 20 connector go through a 2.5 amp resettable fuse to prevent cable or circuit damage in the event of a short.

Bulk +12V is provided to the media console 16 from cable 20. This is used to provide power to the CD-ROM and floppy disk drive DASD connectors 296, and 298 respectively. (It should be noted that +12V is still available in the DASD connector 298 to the floppy disk drive 22 even though current FDD's typically do not use +12V motors.) There is also a current limited +12VDC bulk voltage that is used to regulate down to +5VDC. In order to handle the current requirement of each component of the media console 16, 3 independent regulators are implemented. One regulator 310, is for the 5VDC supply to the electronics (including keyboard and mouse), another regulator 312 is for the 5VDC to the floppy disk drive power connector 298 and a third regulator 314 is for the 5VDC for the CD-ROM power connector 296. The current to all three regulators is limited by a voltage dropping resistor 316. This resistor has been chosen to be a 2.4 ohm 15 watt resistor. Therefore the three regulators can supply a total of about 2 amps of current before dropping out of regulation. The regulators are attached to a sufficient heat sink to prevent overheating. The dropping resistor 316 is physically located on the host card 152 in the system unit 18 so that the total heat dissipation would not be concentrated in the media console 16 where there is no fan. This means that there are two bundles of power conductors in the cable 20: +12VDC and +12V_DROP.

The multi-conductor cable 20 is a 28 gauge, 50 conductor cable composed of 25 pairs with a 50 pin Centronics connector on one end (SCSI) which connects to the Centronics connector 153 on host card 152 and a 50 pin header connector on the other end which connects to a connector port 58 on media console 16. The table in FIG. 11 shows the signal layout of the header. The cable 20 can be in a range of between 4 and 7 feet long with 6½ feet being the preferred length. The cable 20 allows the processing unit 18 to be placed along side, underneath or even behind the desk supporting the media console 16, or in a different room or office from the media console 16.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A computer system comprising:
    a first housing containing an integrated drive electronics (IDE) direct access storage device having an opening for receiving a removable storage medium,
    a second housing separate from said first housing and containing a microprocessor coupled to a local bus and an expansion bus, a first IDE controller, a non-volatile storage device coupled to said local bus and a power supply for supplying power to said system,
    an electrical connector having one end coupled to said first housing and another end coupled to said second housing for electrically connecting devices in said first housing to devices in said second housing, and
    said second housing having a first interface (1) coupled to said expansion bus and said electrical connector and (2) coupled to said first IDE controller via an IDE bus, said first housing having a second interface coupled to said electrical connector and said IDE direct access storage device in said first housing,
    wherein said first interface is operative to (1) determine when a bus cycle initiated by a device in said second housing is directed to said IDE direct access storage device in said first housing and (2) transfer data from said first IDE bus to said IDE direct access storage device in said first housing via said electrical connector and said second interface when a bus cycle is directed to said IDE direct access storage device.

2. The computer system of claim 1, wherein said IDE direct access storage device is a digital versatile disk (DVD) drive and said removable storage medium is a compact disk.

3. The computer system of claim 1, wherein said IDE direct access storage device is a CD-ROM drive and said removable storage medium is a compact disk.

4. The computer system of claim 3, wherein said first housing further includes a floppy disk drive coupled to said second interface and
    wherein said first interface is operative to (1) determine when a bus cycle initiated by a device in said second housing is directed to said floppy disk drive or said CD-ROM drive and (2) transfer data from (i) said expansion bus to said floppy disk drive via said electrical connector and said second interface when said bus cycle is an expansion bus cycle or (ii) the first IDE controller to said CD-ROM drive via said electrical connector and said second interface when said bus cycle is an IDE bus cycle.

5. The computer system of claim 4, wherein said second interface includes an electronic card having a demultiplexer with an input coupled to said electrical connector and an output coupled to a first bus, a diskette adapter coupled between said first bus and said floppy disk drive, a second IDE controller coupled between said first bus and said CD-ROM drive and a keyboard controller coupled to said first bus.

6. The computer system of claim 1, wherein said first interface includes a first electronic card connected to said expansion bus and said electrical connector, said first electronic card having an IDE port coupled to said first IDE controller via an IDE bus, a sequencer for monitoring said IDE bus and said expansion bus and activating first, second and third control signals in sequence when it detects a bus cycle that is directed to a device in said first housing, each of said control signals being supplied to said first housing via said electrical connector, said first control signal being operative to latch an address from said IDE bus or said expansion bus into said first housing, said second control signal being operative to enable data to be transferred from said IDE bus or said expansion bus to said first housing and said third control signal being operative to enable the first housing to generate interrupt request signals.

7. The computer system of claim 1, wherein said first interface includes a control circuit connected to said first IDE controller, said expansion bus and said electrical connector for controlling said transfer of data, a transfer of address and control signals to said second interface via said electrical connector.

8. The computer system of claim 1, wherein said first interface includes a first electronic card connected to said first IDE controller, said expansion bus and said electrical connector, said electronic card having a sequencer for monitoring said expansion bus and said first IDE controller, an IDE port coupled directly to said first IDE controller, and a multiplexer for multiplexing over said electrical connector, IDE and expansion bus address signals, IDE and expansion bus data signals and interrupt request signals between said first IDE controller or said expansion bus respectively, and said second interface.

9. The computer system of claim 8, wherein said system includes a direct coupling for predetermined signals from said IDE direct access storage device to said IDE port on said first electronic card via said electrical connector, wherein said predetermined signals include Master/Slave selection for the CD-ROM drive, and DMA request and acknowledge signals.

10. The computer system of claim 8, wherein said IDE direct access storage device is capable of being selectively operated as a Master or Slave drive via a M/S control signal which is supplied from said IDE port to said IDE direct access storage device via said electrical connector.

11. The computer system of claim 8, wherein said second interface includes a second electronic card having a de-multiplexer with an input coupled to said electrical connector and an output coupled to said direct access storage device, said sequencer being operative to generate control signals to said second electronic card via said electrical connector for controlling said de-multiplexer to output said address and said data, and after outputting said data driving (1) a current state of interrupts on said first housing onto said expansion bus via said electrical connector and said multiplexer of said first electronic card and (2) a current interrupt state of said IDE direct access storage device onto said IDE port via said electrical connector.

12. The computer system of claim 11, wherein said output of said de-multiplexer is a bus which has the width and parallel structure of the expansion bus but only carries a first predetermined address range, a second predetermined number of direct memory access (DMA) channels and a third predetermined number of interrupt request signals and wherein each of said first predetermined address range, said second predetermined number of DMA channels and said third predetermined of interrupt request signals are less than that which is carried by said expansion bus.

13. The computer system of claim 11, wherein said first electronic card further includes a plurality of configuration registers coupled to said sequencer and which enable a predetermined address range that is monitored by said sequencer and correspond to addresses allocated to devices in said first housing.

14. The computer system of claim 13, wherein said plurality of configuration registers further enable a predetermined number of DMA channels which are monitored by said sequencer and correspond to DMA cycles allocated to devices in said first housing.

15. The computer system of claim 1, wherein said expansion bus is an industry standard architecture (ISA) bus.

16. The computer system of claim 1, wherein said bus cycle is a bus cycle selected from the group consisting of an input/output cycle and a DMA cycle.

17. A personal computer system comprising:

a media console containing a floppy disk drive having an opening for receiving a floppy disk and a CD-ROM drive having an opening for receiving a compact disk, said floppy disk drive and said CD-ROM drive being electrically coupled to a multi-conductor cable which extends from one end of said housing, a processing unit separate from said media console and containing a central processing unit (CPU) coupled to a local bus, an expansion bus and a non-volatile storage device, a first IDE controller and a power supply for supplying power to said system, said processing unit being electrically coupled to said media console via said cable, said processing unit having a first interface for (1) determining when a bus cycle initiated by said processing unit is directed to said floppy disk drive or said CD-ROM drive in said media console and (2) transferring data from said processing unit to (i) said floppy disk drive via said cable when said bus cycle is an expansion bus cycle or (ii) said CD-ROM drive via said cable when said bus cycle is an IDE bus cycle.

18. The computer system of claim 17, wherein said first interface (1) is coupled to said first IDE controllerviaan IDE bus and (2) is coupled to said expansion bus, wherein said first interface is operative to transfer data (1) from said expansion bus to said floppy disk drive via said cable when said bus cycle is an expansion bus cycle and (2) from said IDE bus to said CD-ROM drive via said cable when said bus cycle is an IDE bus cycle.

19. The computer system of claim 17, wherein said first housing further includes a second interface coupled to said floppy disk drive, said CD-ROM drive and said cable, wherein said first interface includes a control circuit connected to said first IDE controller, said expansion bus and said cable for controlling said transfer of data, and a transfer of address and control signals to said first housing via said cable.

20. The computer system of claim 19, wherein said first interface includes a first electronic card connected to said expansion bus and said cable, said first electronic card having (1) an IDE port coupled to said first IDE controller via an IDE bus, (2) a sequencer for monitoring said expansion bus, and (3) a multiplexer for multiplexing over said cable, expansion bus and IDE bus address signals, expansion bus and IDE data signals and interrupt request signals between said IDE bus or said expansion bus and said second interface.

21. The computer system of claim 20, wherein said second interface includes a second electronic card having a de-multiplexer with an input coupled to said cable and an output coupled to said floppy disk drive, said sequencer being operative to generate control signals to said second electronic card via said cable for controlling said de-multiplexer to output said address and said data, and after outputting said data driving (1) a current state of interrupts on said first housing onto said expansion bus via said cable and said multiplexer of said first electronic card and (2) a current interrupt state of said CD-ROM drive onto said IDE port via said cable.

22. The computer system of claim 20, wherein said system includes a direct coupling for predetermined signals from said CD-ROM drive to said IDE port on said first electronic card via said cable, wherein said predetermined signals include Master/Slave selection for the CD-ROM drive, and DMA request and acknowledge signals.

23. The computer system of claim 20 wherein said CD-ROM drive is capable of being selectively operated as a Master or Slave drive via a M/S control signal which is supplied from said IDE port to said CD-ROM drive via said cable.

24. The computer system of claim 17, wherein said bus cycle is a bus cycle selected from the group consisting of an input/output cycle and a DMA cycle.

25. A method for transferring data in a computer system between at least one device in a first housing and devices in a second housing, said first housing containing an integrated drive electronics (IDE) direct access storage device (DASD), said second housing being separate from said first housing and containing a microprocessor coupled to a local bus and an expansion bus, a first IDE controller, a non-volatile storage device coupled to said local bus and a power supply, an electrical connector coupled to said first and second housings for electrically connecting devices in said first housing to devices in said second housing, and said second housing having a first interface (1) coupled to said expansion bus and said electrical connector and (2) coupled to said first IDE controller via an IDE bus, said first housing having a second interface coupled to said electrical connector and said IDE direct access storage device in said first housing, said method comprising the steps of:

monitoring said IDE bus to determine when a bus cycle initiated by a device in said second housing is directed to said IDE direct access storage device in said first housing, and transferring data from said IDE bus to said IDE direct access storage device in said first housing via said electrical connector and said second interface when a bus cycle is directed to said IDE direct access storage device.

26. The method of claim 25, wherein said IDE DASD device in said first housing is operative to generate a predetermined number of interrupts, said method further including transferring a current state of each of said interrupts from said first housing to said IDE bus via said electrical connector.

27. The method of claim 25, wherein said transfer step includes controlling with said first interface said transfer of data, a transfer of address and control signals to said second interface via said electrical connector.

28. The method of claim 25, wherein said bus cycle is a bus cycle selected from the group consisting of an input/output cycle and a DMA cycle.

29. The method of claim 25, wherein said direct access storage device is a CD-ROM drive and said removable storage medium is a compact disk.

30. The method of claim 29, wherein said first housing further includes a floppy disk drive coupled to said second interface and wherein said monitoring step includes determining when a bus cycle initiated by a device in said second housing is directed to said floppy disk drive or said CD-ROM drive, and wherein said transfer step includes transferring data from (i) said expansion bus to said floppy disk drive via said electrical connector and said second interface when said bus cycle is an expansion bus cycle or (ii) the first IDE controller to said CD-ROM drive via said electrical connector and said second interface when said bus cycle is an IDE bus cycle.

31. The method of claim 30, wherein said first interface includes a first electronic card connected to said expansion bus and said electrical connector, said first electronic card having an IDE port coupled to said first IDE controller via said IDE bus, said electronic card having a sequencer for monitoring said IDE bus and said expansion bus and said method includes the steps of:

activating a first control signal from said first interface across said electrical connector and to said second interface when it is determined that a bus cycle is directed to a device in said first housing, said first control signal being operative to latch an address from said IDE bus or said expansion bus into said first housing, activating a second control signal from said first interface across said electrical connector and to said second interface, said second control signal being operative to enable data to be transferred from said IDE bus or said expansion bus to said first housing and transferring said data from said IDE bus or said expansion bus to said CD-ROM drive or said floppy disk drive respectively.

32. The method of claim 31, further including the step of multiplexing said address and said data from said IDE bus or said expansion bus onto said electrical connector.

33. The method of claim 31, further including the step of coupling predetermined signals directly from said CD-ROM drive to said IDE port on said first electronic card via said electrical connector, wherein said predetermined signals include Master/Slave selection for the CD-ROM drive, and DMA request and acknowledge signals.

34. The method of claim 31, further including the step of selectively operating said CD-ROM drive as a Master or Slave drive via a M/S control signal which is supplied from said IDE port to said CD-ROM drive via said electrical connector.

35. The method of claim 25, further including the step of enabling a predetermined address range that is monitored by a control circuit in said first interface and corresponds to addresses allocated to said IDE device in said first housing.

36. A computer system comprising:

a first housing containing a IDE direct access storage device having an opening for receiving a removable storage medium, a second housing containing a microprocessor coupled to a local bus and an expansion bus, a first IDE controller, a non-volatile storage device coupled to said local bus and a power supply for supplying power to said system, an electrical connector having one end coupled to said first housing and another end coupled to said second housing for electrically connecting devices in said first housing to devices in said second housing, and said second housing having a first interface coupled to said expansion bus, said first IDE controller and said electrical connector, said first housing having a second interface coupled to said electrical connector and said IDE direct access storage device in said first housing, wherein said first interface is operative to multiplex data and address signals from said first IDE controller and send the multiplexed signals across said electrical connector to said second interface, wherein said second interface is operative to demultiplex said data and address signals and send the demultiplexed signals to said IDE direct access storage device.

37. The computer system of claim 36, wherein said first interface further includes control circuitry for monitoring IDE bus cycles and controlling said multiplexing of data and address signals when a bus cycle is directed to said IDE direct access storage device in said first housing.

38. The computer system of claim 37, wherein said bus cycle is a bus cycle selected from the group consisting of an input/output cycle and a direct memory access cycle.

39. The computer system of claim 36, wherein said direct access storage device is a CD-ROM drive and said removable storage medium is a compact disk.

40. The computer system of claim 39, wherein said first housing further includes a floppy disk drive (FDD) coupled to said second interface and wherein said first interface is operative to multiplex data and addresses from said first IDE controller and said expansion bus and send said multiplexed signals across said electrical connector to said second interface, said second interface is operative to demultiplex said data and address signals and send such demultiplexed signals to said CD ROM drive or said FDD.

41. The computer system of claim 36, wherein said first interface includes a first electronic card connected to said IDE controller and said electrical connector, said electronic card having a sequencer for monitoring said IDE bus cycles, and a multiplexer for multiplexing over said electrical connector, said data and address signals.

* * * * *